US011767614B2

(12) United States Patent
Huang et al.

(10) Patent No.: US 11,767,614 B2
(45) Date of Patent: Sep. 26, 2023

(54) PREPARATION METHOD OF CHITIN-MODIFIED POLYPROPYLENE SPUNBOND NON-WOVEN FABRIC

(71) Applicants: SINOTECH ACADEMY OF TEXTILE (QINGDAO) CO., LTD., Qingdao (CN); BESTEE MATERIAL (TSINGTAO) CO., LTD., Qingdao (CN)

(72) Inventors: Xiaohua Huang, Qingdao (CN); Yanming Liu, Qingdao (CN); Xiaoqian Huang, Qingdao (CN)

(73) Assignees: SINOTECH ACADEMY OF TEXTILE (QINGDAO) CO., LTD., Qingdao (CN); BESTEE MATERIAL (TSINGTAO) CO., LTD., Qingdao (CN)

( * ) Notice: Subject to any disclaimer, the term of this patent is extended or adjusted under 35 U.S.C. 154(b) by 239 days.

(21) Appl. No.: 17/116,445

(22) Filed: Dec. 9, 2020

(65) Prior Publication Data

US 2021/0180213 A1 Jun. 17, 2021

(30) Foreign Application Priority Data

Dec. 16, 2019 (CN) .......................... 201911290020.6

(51) Int. Cl.
| | |
|---|---|
| *C08L 5/08* | (2006.01) |
| *D01D 1/04* | (2006.01) |
| *D01D 5/088* | (2006.01) |
| *D01F 1/02* | (2006.01) |
| *D01F 1/10* | (2006.01) |
| *D01F 6/06* | (2006.01) |
| *D04H 3/007* | (2012.01) |
| *D04H 3/045* | (2012.01) |
| *D06C 7/00* | (2006.01) |
| *D06C 15/00* | (2006.01) |
| *C08L 23/12* | (2006.01) |
| *D01F 6/46* | (2006.01) |
| *D04H 1/4291* | (2012.01) |
| *C08J 3/20* | (2006.01) |
| *C08B 37/08* | (2006.01) |

(52) U.S. Cl.
CPC ............ *D01F 1/103* (2013.01); *C08B 37/003* (2013.01); *C08J 3/203* (2013.01); *C08L 23/12* (2013.01); *D01F 6/46* (2013.01); *D04H 1/4291* (2013.01); *C08L 2203/12* (2013.01); *C08L 2205/035* (2013.01); *C08L 2205/06* (2013.01); *D10B 2321/022* (2013.01)

(58) Field of Classification Search
CPC .......... C08B 37/003; C08J 3/203; C08L 5/08; C08L 23/12; C08L 2203/12; C08L 2205/06; D01D 1/04; D01D 5/088; D01F 1/02; D01F 1/10; D01F 6/06; D04H 3/007; D04H 3/045; D06C 7/00; D06C 15/00; D10B 2321/022
USPC ........... 264/103, 211, 211.14, 211.2, 331.17; 524/27; 536/20
See application file for complete search history.

(56) References Cited

U.S. PATENT DOCUMENTS

| | | | |
|---|---|---|---|
| 4,692,487 A * | 9/1987 | Son ...................... | C07D 241/08 544/231 |
| 2012/0237576 A1* | 9/2012 | Gordon .................... | D01F 1/10 264/211 X |

FOREIGN PATENT DOCUMENTS

CN 108560149 A * 9/2018 ............. D04H 3/007

OTHER PUBLICATIONS

Translation of CN 108560149 A (published on Sep. 21, 2018).*

* cited by examiner

*Primary Examiner* — Leo B Tentoni
(74) *Attorney, Agent, or Firm* — ANOVA LAW GROUP, PLLC

(57) ABSTRACT

A chitin-modified polypropylene spunbond non-woven fabric and a preparation method of the chitin-modified polypropylene spunbond non-woven fabric are provided. The chitin-modified polypropylene spunbond non-woven fabric contains a modified chitin in a weight percentage range of approximately 0.2%-1.5%. The modified chitin includes chitin modified by a modifier including 2-hydroxybenzimidazole, cellulose acetate butyrate, and adipic acid dihydrazide. The chitin-modified polypropylene spunbond non-woven fabric has an anti-mold grade less than 1, and an antibacterial rate greater than 9.5%.

8 Claims, No Drawings

PREPARATION METHOD OF CHITIN-MODIFIED POLYPROPYLENE SPUNBOND NON-WOVEN FABRIC

CROSS-REFERENCE TO RELATED APPLICATION

This application claims the priority of Chinese patent application No. 201911290020.6, filed on Dec. 16, 2019, the entirety of which is incorporated herein by reference.

FIELD OF THE DISCLOSURE

The present disclosure generally relates to the field of spunbond non-woven fabric technology and, more particularly, relates to a chitin-modified polypropylene spunbond non-woven fabric and a preparation method thereof.

BACKGROUND

Chitin is a non-toxic, odorless, white or gray, translucent solid, and is hard to be dissolved in water, dilute acid, dilute alkali and general organic solvent, which limits its application and development. After removing the contained acetyl group by concentrated alkali treatment, the chitin becomes soluble chitin, which is also known as chitosan and has a chemical name (1,4)-2-amino-2-deoxy-β-D-glucose, or abbreviated as polyamino glucose. Because the chitosan contains a large number of amino groups in macromolecular structure, thereby greatly improving the solubility and chemical activity of chitin. Therefore, the chitosan has a wide range of applications in medical, nutrition and health care.

Soluble chitin is used as an anti-mold and sterilization deodorant for textiles in industry. The soluble chitin is attached to textile fibers through post-processing, which is one of methods to increase the added value of textile. The soluble chitin is used for manufacturing underwear, sock, household special functional textile, surgical gown/cloth, wound dressing, or burn wound dressing. Further, the soluble chitin is deep-processed into artificial skin for the treatment of large-area burns. Because soluble chitin (chitosan) is a cationic natural polymer, and effectively inhibits microorganism/bacteria/mold.

As the demand for clothing differentiation increases, functional fibers or fabrics are becoming more and more popular. Therefore, adding functional substances in fibers or fabrics to prepare a new material, such as adding soluble chitin in the preparation process of PP fiber, has become a development trend in the textile industry, but any technological progress will face one technical problem after another. Because the soluble chitin tends to be decomposed at 120° C., while the temperature in the preparation process of PP fiber can reach above 150° C., which easily causes the decomposition of soluble chitin and affects the functional and physical properties of the prepared pp fiber. Due to the decomposition of chitosan, in the initial use of fiber or fabric, the problem does not occur, while with the use of fiber or fabric, the fiber surface is prone to mildew and have fiber adhesion. The disclosed methods and non-woven fabric are directed to solve one or more problems set forth above and other problems.

BRIEF SUMMARY OF THE DISCLOSURE

One aspect of the present disclosure includes a chitin-modified polypropylene spunbond non-woven fabric. The chitin-modified polypropylene spunbond non-woven fabric contains a modified chitin in a weight percentage range of approximately 0.2%-1.5%. The modified chitin includes chitin modified by a modifier including 2-hydroxybenzimidazole, cellulose acetate butyrate, and adipic acid dihydrazide.

In one embodiment, an anti-mold grade of the chitin-modified polypropylene spunbond non-woven fabric is less than 1; and an antibacterial rate of the chitin-modified polypropylene spunbond non-woven fabric is greater than 99.5%.

In one embodiment, the modified chitin is prepared by modifying a soluble chitin.

In one embodiment, preparation method of the modified chitin includes: mixing the soluble chitin and a lactic acid with a pH value of approximately 3-5 to swell; stirring the mixture at approximately 15° C.-25° C. for approximately 10 min-20 min; adding the modifier; performing an ultra-sonication for 5 min-10 min; increasing the temperature to approximately 30° C.-35° C.; adding glutaraldehyde and N-hydroxysuccinimide; maintaining the reaction for approximately 13 min-15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

In one embodiment, a mass ratio of the soluble chitin, the modifier, glutaraldehyde, and N-hydroxysuccinimide is in a range of approximately (10-15): (1-3): (2-4): (1-2).

In one embodiment, a mass ratio of 2-hydroxybenzimidazole, cellulose acetate butyrate, and adipic acid dihydrazide is in a range of approximately 1:(3-5):(2-3).

In one embodiment, the chitin-modified polypropylene spunbond non-woven fabric further includes polyethylene glycol, and the polyethylene glycol includes polyethylene glycol 4000 or polyethylene glycol 6000.

In one embodiment, the chitin-modified polypropylene spunbond non-woven fabric further includes antioxidant, and the antioxidant includes antioxidant 2013 or antioxidant 3125.

In one embodiment, the chitin-modified polypropylene spunbond non-woven fabric further includes polyvinylpyrrolidone.

Another aspect of the present disclosure includes a preparation method of a chitin-modified polypropylene spunbond non-woven fabric. The method includes adding polypropylene and modified chitin with a weight percentage range of approximately 0.2%-1.5% to a horizontal double ribbon mixer; heating the polypropylene and the modified chitin to a temperature of approximately 40° C.-80° C.; mixing the polypropylene and the modified chitin at a medium speed for approximately 20 min-40 min; adding polyethylene glycol, polyvinylpyrrolidone and antioxidant; heating polypropylene, the modified chitin, polyethylene glycol, polyvinylpyrrolidone and antioxidant to a temperature of approximately 180° C.-190° C.; mixing polypropylene, the modified chitin, polyethylene glycol, polyvinylpyrrolidone and antioxidant at a high speed for approximately 20 min-40 min to obtain a mixed material liquid; pressing the mixed material liquid into a spinning box; obtaining a fiber net by spinning, cooling the box by side blowing, and pulling; and hot-rolling the fiber net into a fabric by a hot-rolling machine to obtain the chitin-modified polypropylene spunbond non-woven fabric.

In one embodiment, a hot-rolling temperature of the fiber net on the hot-rolling machine is in a range of approximately 140° C.-150° C.

In one embodiment, an operating pressure of pressing the mixed material liquid into the spinning box is in a range of approximately 2 MPa-5 MPa.

In one embodiment, the antioxidant includes antioxidant 2013 or antioxidant 3125.

In one embodiment, the modified chitin is prepared by modifying a soluble chitin.

In one embodiment, preparation method of the modified chitin includes: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min-15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

In one embodiment, a mass ratio of the soluble chitin, the modifier, glutaraldehyde, and N-hydroxysuccinimide is in a range of approximately (10-15): (1-3): (2-4): (1-2).

In one embodiment, the modifier includes 2-hydroxybenzimidazole, cellulose acetate butyrate, and adipic acid dihydrazide. A mass ratio of 2-hydroxybenzimidazole, cellulose acetate butyrate, and adipic acid dihydrazide is in a range of approximately 1:(3-5):(2-3).

In one embodiment, the polyethylene glycol includes polyethylene glycol 4000 or polyethylene glycol 6000.

In one embodiment, the chitin-modified polypropylene spunbond non-woven fabric has an anti-mold grade less than 1, and an antibacterial rate greater than 99.5%.

Another aspect of the present disclosure includes a chitin-modified polypropylene spunbond non-woven fabric prepared by the above-disclosed method.

Other aspects of the present disclosure can be understood by those skilled in the art in light of the description, the claims, and the drawings of the present disclosure.

DETAILED DESCRIPTION

Exemplary Embodiment 1

The present disclosure provides a chitin-modified polypropylene (PP) spunbond non-woven fabric. The chitin-modified PP spunbond non-woven fabric may contain 95 Kg polypropylene, 0.22 Kg modified chitin, 1.1 Kg polyethylene glycol, 0.3 Kg polyvinylpyrrolidone, and 0.3 Kg antioxidant. The antioxidant may be antioxidant 3125.

Preparation method of the modified chitin may include: mixing the commercially available soluble chitin and a lactic acid with a pH value of approximately 3-5 to swell; stirring the mixture at approximately 15° C.-25° C. for approximately 10 min-20 min; adding modifier; performing an ultra-sonication for approximately 5 min-10min; increasing the temperature to approximately 30° C.-35° C.; adding glutaraldehyde and N-hydroxysuccinimide; maintaining the reaction for approximately 13 min-15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2).

Exemplary Embodiment 2

The present disclosure provides a chitin-modified polypropylene (PP) spunbond non-woven fabric. The chitin-modified PP spunbond non-woven fabric may contain 100 Kg polypropylene, 1 Kg modified chitin, 5 Kg polyethylene glycol 6000, 0.1 Kg polyvinylpyrrolidone, and 0.6 Kg antioxidant. The antioxidant may be antioxidant 2013.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2).

Exemplary Embodiment 3

The present disclosure provides a chitin-modified polypropylene (PP) spunbond non-woven fabric. The chitin-modified PP spunbond non-woven fabric may contain 94 Kg polypropylene, 1.2 Kg modified chitin, 4 Kg polyethylene glycol, 0.15 Kg polyvinylpyrrolidone, and 0.4 Kg antioxidant. The antioxidant may be antioxidant 3125.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2).

Exemplary Embodiment 4

The present disclosure provides a chitin-modified polypropylene (PP) spunbond non-woven fabric. The chitin-modified PP spunbond non-woven fabric may contain 95 Kg polypropylene, 1.5 Kg modified chitin, 3 Kg polyethylene glycol 4000, 0.2 Kg polyvinylpyrrolidone K30, and 0.5 Kg antioxidant. The antioxidant may be antioxidant 3125.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2).

Exemplary Embodiment 5

The present disclosure provides a chitin-modified polypropylene (PP) spunbond non-woven fabric. The chitin-modified PP spunbond non-woven fabric may contain 95 Kg polypropylene, 1.9 Kg modified chitin, 3 Kg polyethylene glycol 6000, 0.2 Kg polyvinylpyrrolidone K30, and 0.5 Kg antioxidant. The antioxidant may be antioxidant 3125.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2).

Exemplary Embodiment 6

The present disclosure provides a preparation method of a chitin-modified polypropylene (PP) spunbond non-woven fabric. The preparation method may include following.

Step 1: adding 90 Kg polypropylene and 0.2 Kg modified chitin to a horizontal double ribbon mixer; heating to a temperature of approximately 40° C.; mixing at a medium speed for approximately 20 minutes; adding 1 Kg polyethylene glycol, 0.3 Kg polyvinylpyrrolidone and 0.3 Kg antioxidant; heating to a temperature of approximately 180° C.; and mixing at a high speed for approximately 20 minutes to obtain a mixed material liquid.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2). The antioxidant may be antioxidant 3125.

Step 2: pressing the mixed material liquid obtained in step 1 into a spinning box; obtaining a fiber net by spinning, cooling the box by side blowing, and pulling; and hot-rolling the fiber net into a fabric by a hot-rolling machine to obtain the chitin-modified polypropylene (PP) spunbond non-woven fabric.

Exemplary Embodiment 7

The present disclosure provides a preparation method of a chitin-modified polypropylene (PP) spunbond non-woven fabric. The preparation method may include following.

Step 1: adding 100 Kg polypropylene and 0.9 Kg modified chitin to a horizontal double ribbon mixer; heating to a temperature of approximately 80° C.; mixing at a medium speed for approximately 40 minutes; adding 5 Kg polyethylene glycol, 0.1 Kg polyvinylpyrrolidone and 0.6 Kg antioxidant 2013; heating to a temperature of approximately 190° C.; and mixing at a high speed for approximately 40 minutes to obtain a mixed material liquid.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2).

Step 2: pressing the mixed material liquid obtained in step 1 into a spinning box; obtaining a fiber net by spinning, cooling the box by side blowing, and pulling; and hot-rolling the fiber net into a fabric by a hot-rolling machine to obtain the chitin-modified polypropylene (PP) spunbond non-woven fabric.

Exemplary Embodiment 8

The present disclosure provides a preparation method of a chitin-modified polypropylene (PP) spunbond non-woven fabric. The preparation method may include following.

Step 1: adding 94 Kg polypropylene and 1.2 Kg modified chitin to a horizontal double ribbon mixer; heating to a temperature of approximately 50° C.; mixing at a medium speed for 25 minutes; adding 4 Kg polyethylene glycol, 0.15

Kg polyvinylpyrrolidone and 0.4 Kg antioxidant; heating to a temperature of approximately 182° C.; and mixing at a high speed for 25 minutes to obtain a mixed material liquid.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant; and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2). The antioxidant may be antioxidant 3125.

Step 2: pressing the mixed material liquid obtained in step 1 into a spinning box; obtaining a fiber net by spinning, cooling the box by side blowing, and pulling; and hot-rolling the fiber net into a fabric by a hot-rolling machine to obtain the chitin-modified polypropylene (PP) spunbond non-woven fabric.

Exemplary Embodiment 9

The present disclosure provides a preparation method of a chitin-modified polypropylene (PP) spunbond non-woven fabric. The preparation method may include following.

Step 1: adding 95 Kg polypropylene and 1.5 Kg modified chitin to a horizontal double ribbon mixer; heating to a temperature of approximately 60° C.; mixing at a medium speed for 30 minutes; adding 3 Kg polyethylene glycol 4000, 0.2 Kg polyvinylpyrrolidone K30 and 0.5 Kg antioxidant; heating to a temperature of approximately 185° C.; and mixing at a high speed for 30 minutes to obtain a mixed material liquid.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant, and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2). The antioxidant may be antioxidant 3125.

Step 2: pressing the mixed material liquid obtained in step 1 into a spinning box; obtaining a fiber net by spinning, cooling the box by side blowing, and pulling; and hot-rolling the fiber net into a fabric by a hot-rolling machine to obtain the chitin-modified polypropylene (PP) spunbond non-woven fabric.

Exemplary Embodiment 10

The present disclosure provides a preparation method of a chitin-modified polypropylene (PP) spunbond non-woven fabric. The preparation method may include following.

Step 1: adding 95 Kg polypropylene and 1.9 Kg modified chitin to a horizontal double ribbon mixer; heating to a temperature of approximately 60° C.; mixing at a medium speed for 30 minutes; adding 3 Kg polyethylene glycol 6000, 0.2 Kg polyvinylpyrrolidone K30 and 0.5 Kg antioxidant; heating to a temperature of approximately 185° C.; and mixing at a high speed for 30 minutes to obtain a mixed material liquid.

Preparation method of the modified chitin may include: mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min -15 min to obtain a reaction solution; adding chloroacetic acid to the reaction solution; stirring at approximately 40° C.-80° C. for approximately 3 hours-5 hours to obtain a mixed solution; removing the supernatant, and performing a vacuum drying to obtain the modified chitin.

The modifier may include: 2-hydroxybenzimidazole, cellulose acetate butyrate, and adipic acid dihydrazide. A mass ratio of 2-hydroxybenzimidazole, cellulose acetate butyrate, and adipic acid dihydrazide may be in a range of approximately 1:(3-5):(2-3). A mass ratio of soluble chitin, modifier, glutaraldehyde, and N-hydroxysuccinimide may be in a range of approximately (10-15): (1-3): (2-4): (1-2). The antioxidant may be antioxidant 3125.

Step 2: pressing the mixed material liquid obtained in step 1 into a spinning box; obtaining a fiber net by spinning, cooling the box by side blowing, and pulling; and hot-rolling the fiber net into a fabric by a hot-rolling machine to obtain the chitin-modified polypropylene (PP) spunbond non-woven fabric.

Comparative Embodiment 11

Embodiment 11 for preparing a chitin-modified polypropylene (PP) spunbond non-woven fabric may be based on the above described exemplary Embodiment 10, except that the amount of added modified chitin may be changed to 3.5 Kg, while other processes may be the same as or similar with the processes in the exemplary Embodiment 10.

Comparative Embodiment 12

Embodiment 12 for preparing a chitin-modified polypropylene (PP) spunbond non-woven fabric may be based on the above described exemplary Embodiment 10, except that the amount of added modified chitin may be changed to 4.0 Kg, while other processes may be the same as or similar with the processes in the exemplary Embodiment 10.

Comparative Embodiment 13

Embodiment 13 for preparing a chitin-modified polypropylene (PP) spunbond non-woven fabric may be based on the above described exemplary Embodiment 10, except that the amount of added modified chitin may be changed to 4.5 Kg, while other processes may be the same as or similar with the processes in the exemplary Embodiment 10.

Comparative Embodiment 14

Embodiment 14 for preparing a chitin-modified polypropylene (PP) spunbond non-woven fabric may be based on the above described exemplary Embodiment 10, except that the amount of added modified chitin may be changed to 0.09 Kg, while other processes may be the same as or similar with the processes in the exemplary Embodiment 10.

Comparative Embodiment 15

Embodiment 15 for preparing a chitin-modified polypropylene (PP) spunbond non-woven fabric may be based on the above described exemplary Embodiment 10, except that the amount of added modified chitin may be changed to 0.05 Kg, while other processes may be the same as or similar with the processes in the exemplary Embodiment 10.

Comparative Embodiment 16

Embodiment 16 for preparing a chitin-modified polypropylene (PP) spunbond non-woven fabric may be based on the above described exemplary Embodiment 10, except that the amount of added modified chitin may be changed to 0 Kg, while other processes may be the same as or similar with the processes in the exemplary Embodiment 10.

The performance of chitin-modified PP spunbond non-woven fabric in exemplary Embodiments 6-10 and comparative Embodiments 11-16 may be tested. The air permeability of the material may be tested according to the ISO9237-1995 standard, and the breaking strength and breaking elongation may be tested according to GB/T 24218.3-2010. For the PP spunbond non-woven fabric with a same gram weight of approximately 20±0.5 g/m$^2$, the results may be shown in Table 1.

performance of prepared fabric may be obviously reduced. When the content of modified chitin is greater than or equal to 1.5%, the physical properties of the prepared non-woven fabric may be significantly reduced, which may not meet the demands of normal production and application. Therefore, the optimal content of modified chitin in the chitin-modified pp spunbond non-woven fabric prepared in the present disclosure may be in a range of approximately 0.2%-1.5%.

Water absorption test may be performed on the pp spunbond non-woven fabric having a same gram weight of approximately 20±0.5 g/m$^2$. The water absorption speed and water absorption amount may be tested. The water absorption speed test method may include following. The chitin-modified pp spunbond non-woven fabric may be cut into a 10 cm×10 cm square sheet, 1 ml water may be dropped on the test bench, the sheet-shaped non-woven fabric may be slowly approached to the water, and the duration that the non-woven fabric fully adsorbs the water, i.e., the non-woven fabric is fully moistened may be recorded by a stopwatch. The water absorption amount test may include following. The 10 cm×10 cm square-shaped non-woven fabric may be weighted, and the weight m1 may be recorded; and then, the non-woven fabric may be soaked in water for 10 s. After the non-woven fabric is taken out and

TABLE 1

| Embodiments | Breaking strength (/N/5 cm) | Breaking elongation (%) | Antibacterial rate of *Staphylococcus aureus*/% | Antibacterial rate of *Escherichia coli*/% | Anti-mold grade |
|---|---|---|---|---|---|
| Embodiment 6 | 58.74 | 50.33 | 99.60 | 99.50 | 0 |
| Embodiment 7 | 58.72 | 50.32 | 98.70 | 98.70 | 0 |
| Embodiment 8 | 58.83 | 50.37 | 98.50 | 99.90 | 0 |
| Embodiment 9 | 52.85 | 45.38 | 98.80 | 99.20 | 0 |
| Embodiment 10 | 49.84 | 40.39 | 99.90 | 99.90 | 0 |
| Embodiment 11 | 48.23 | 41.65 | 99.80 | 99.30 | 4 |
| Embodiment 12 | 48.34 | 41.64 | 99.90 | 99.20 | 4 |
| Embodiment 13 | 43.82 | 37.63 | 99.90 | 99.90 | 3 |
| Embodiment 14 | 58.85 | 50.37 | 84.30 | 84.60 | 4 |
| Embodiment 15 | 58.87 | 50.14 | 83.50 | 84.20 | 3 |
| Embodiment 16 | 60.28 | 22.129 | 83.50 | 82.50 | ≥5 |

The chitin-modified pp spunbond non-woven fabric prepared in the present disclosure may be tested according to GB/T24346-2009 Textiles-Evaluation for anti-mold activity. According to the results in Table 1, the anti-mold grade of the chitin-modified pp spunbond non-woven fabric in Embodiments 6-10 may be less than or equal to 1, while the anti-mold grade of the chitin-modified pp spunbond non-woven fabric in Embodiments 11-16 may be greater than or equal to 3. Especially, when the content of modified chitin in PP spunbond non-woven fabric is less than or equal to 0.2, the anti-mold grade may significantly change. When the content of modified chitin is 0, the anti-mold grade may be greater than or equal to 5, and a phenomenon of mildew coverage >60% may occur. Therefore, the addition of modified chitin in the preparation process may avoid and reduce the decomposition of soluble chitin, and may further improve the anti-mold grade of the prepared textile.

At the same time, when the content of modified chitin in the prepared non-woven fabric is in a range of approximately 0.2%-1.5%, the prepared fabric may have desired antibacterial performance, and the physical properties thereof may meet the demands of production. When the content of modified chitin is less than 0.2%, the antibacterial is not dripping, the wet non-woven fabric may be weighted, and the weight m2 of the wet non-woven fabric may be recorded. The water absorption amount per gram may be (m2−m1)/m1, and the results may be shown in Table 2. For example, Table 2 shows test results of water absorption and adhesion grade of chitin-modified pp spunbond non-woven fabrics. Note that when performing water absorption amount test, the surface of the conventional non-woven fabric in Embodiment 16 may not be wet.

The textile may be cut into a plurality of 30 cm×30 cm small pieces, and then the plurality of small pieces may be stacked together and placed in an environmental condition with a humidity in a range of approximately 20-30 and a temperature in a range of approximately 30° C.-40° C. After 20 days-50 days, the adhesion phenomenon on the surface of the textile may be observed. The adhesion situation may be divided into 4 grades, where grade 1 may refer to that the block textiles are nearly free of adhesion, grade 2 may refer to that adhesion area is less than 20%, grade 3 may refer to that adhesion area is greater than 20% and less than 40%, and grade 4 may refer to that adhesion area is greater than 40% and less than 60%.

TABLE 2

| Embodiments | Adhesion grade | Duration for water absorption (s) | Water absorption amount (times) |
|---|---|---|---|
| Embodiment 6 | 1 | 3.1 | 18.6 |
| Embodiment 7 | 1 | 2.6 | 17.4 |
| Embodiment 8 | 1 | 2.7 | 17.2 |
| Embodiment 9 | 1 | 2.9 | 18.0 |
| Embodiment 10 | 1 | 3.8 | 19.2 |
| Embodiment 11 | 3 | 4.1 | 19.8 |
| Embodiment 12 | 5 | 4.1 | 19.1 |
| Embodiment 13 | 3 | 4.2 | 19.6 |
| Embodiment 14 | 4 | 4.0 | 8.2 |
| Embodiment 15 | 3 | 4.0 | 9.3 |
| Embodiment 16 | ≥4 | — | — |

According to the results in Table 2, the adhesion grade of the chitin-modified pp spunbond non-woven fabrics in Embodiments 6-10 may be less than 1, and may not have adhesion phenomenon. At the same time, the chitin-modified pp spunbond non-woven fabrics in Embodiments 6-10 may have a substantially fast water absorption speed, may have desired moisture absorption and desired hydrophilic properties, and may have approximately 15 times water absorption amount.

The chitin-modified pp spunbond non-woven fabrics in Embodiments 11-16 may have adhesion phenomenon. Especially, when the content of chitin is 0, the pp spunbond non-woven fabric may have an adhesion grade greater than 4, and may have serious adhesion phenomenon.

The soluble chitin in the present disclosure may be commercially available. Unless otherwise specified, the soluble chitin in the present disclosure may refer to chitosan.

The present disclosure may have following beneficial effects. In the preparation process of the chitin-modified PP fiber, by modifying the chitin, the swelling time may be greatly reduced after ultra-sonication, the stability of soluble chitin may be improved. Therefore, the modified chitin may be prevented from being decomposed at high temperature when being mixed in a pp spinning process, and ultimately the prepared fibers or fabrics may be prevented from mildew and fiber adhesion.

In the process of modifying chitin, the standing step may be removed to optimize the modification process, which may greatly reduce the modification duration of chitosan by 3-5 times and improve the production efficiency.

The anti-mold grade of pp spunbond non-woven fabric prepared in the present disclosure may be less than or equal to 1. By adding modified chitin, the prepared pp spunbond non-woven fabric may have desired antibacterial performance, and the overall antibacterial rate may be above 99.5%.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A preparation method of a chitin-modified polypropylene spunbond non-woven fabric, comprising:
adding polypropylene and modified chitin with a weight percentage range of approximately 0.2%-1.5% to a horizontal double ribbon mixer;
heating the polypropylene and the modified chitin to a temperature of approximately 40° C.-80° C.;
mixing the polypropylene and the modified chitin for approximately 20 min-40 min;
adding polyethylene glycol, polyvinylpyrrolidone and antioxidant;
heating polypropylene, the modified chitin, polyethylene glycol, polyvinylpyrrolidone and antioxidant to a temperature of approximately 180° C.-190° C.;
mixing polypropylene, the modified chitin, polyethylene glycol, polyvinylpyrrolidone and antioxidant for approximately 20 min-40 min to obtain a mixed material liquid;
pressing the mixed material liquid into a spinning box;
obtaining a fiber net by spinning, cooling the box by side blowing, and pulling; and
hot-rolling the fiber net into a fabric by a hot-rolling machine to obtain the chitin-modified polypropylene spunbond non-woven fabric.

2. The method according to claim 1, wherein:
a hot-rolling temperature of the fiber net on the hot-rolling machine is in a range of approximately 140° C.-150° C.

3. The method according to claim 1, wherein:
an operating pressure of pressing the mixed material liquid into the spinning box is in a range of approximately 2 MPa-5 MPa.

4. The method according to claim 1, wherein:
the modified chitin is prepared by modifying a soluble chitin.

5. The method according to claim 4, wherein preparation method of the modified chitin includes:
mixing the soluble chitin and a lactic acid with a pH value of approximately 3-5 to swell; stirring the mixture at approximately 15° C.-25° C. for approximately 10 min-20 min; adding modifier; performing an ultra-sonication for 5 min-10 min; increasing the temperature to approximately 30° C.-35° C.; adding glutaraldehyde and N-hydroxysuccinimide; maintaining the reaction for approximately 13 min-15 min to obtain a reaction solution; adding chloroacetic acid to the reaction solution; stirring at approximately 40° C.-80° C. for approximately 3 hours-5 hours to obtain a mixed solution; removing a supernatant; and performing a vacuum drying to obtain the modified chitin.

6. The method according to claim 5, wherein:
a mass ratio of the soluble chitin, the modifier, glutaraldehyde, and N-hydroxysuccinimide is in a range of approximately (10-15): (1-3): (2-4): (1-2).

7. The method according to claim 5, wherein:
the modifier includes 2-hydroxybenzimidazole, cellulose acetate butyrate, and adipic acid dihydrazide; and
a mass ratio of 2-hydroxybenzimidazole, cellulose acetate butyrate, and adipic acid dihydrazide is in a range of approximately 1:(3-5):(2-3).

8. The method according to claim 1, wherein the chitin-modified polypropylene spunbond non-woven fabric has:
an anti-mold grade less than 1; and
an antibacterial rate greater than 99.5%.

* * * * *